(12) United States Patent
Pismenny et al.

(10) Patent No.: US 11,005,771 B2
(45) Date of Patent: May 11, 2021

(54) COMPUTATIONAL ACCELERATOR FOR PACKET PAYLOAD OPERATIONS

(71) Applicant: Mellanox Technologies, Ltd., Yokneam (IL)

(72) Inventors: Boris Pismenny, Haifa (IL); Liran Liss, Atzmon (IL); Ilya Lesokhin, Ein Ha'Shofet (IL); Haggai Eran, Yokneam Illit (IL); Adi Menachem, Hod Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 182 days.

(21) Appl. No.: 16/159,767

(22) Filed: Oct. 15, 2018

(65) Prior Publication Data

US 2019/0116127 A1 Apr. 18, 2019

Related U.S. Application Data

(60) Provisional application No. 62/572,578, filed on Oct. 16, 2017.

(51) Int. Cl.
*H04L 12/833* (2013.01)
*H04L 29/06* (2006.01)
(Continued)

(52) U.S. Cl.
CPC .............. *H04L 47/31* (2013.01); *H04L 12/00* (2013.01); *H04L 12/413* (2013.01);
(Continued)

(58) Field of Classification Search
CPC ....... H04L 1/0045; H04L 1/0082; H04L 1/16; H04L 1/1838; H04N 19/61; H04N 19/70;
(Continued)

(56) References Cited

U.S. PATENT DOCUMENTS

| 6,901,496 B1 | 5/2005 | Mukund et al. |
| 7,657,659 B1 | 2/2010 | Lambeth et al. |

(Continued)

FOREIGN PATENT DOCUMENTS

| EP | 1657878 A1 | 5/2006 |
| EP | 2463782 A2 | 6/2012 |
| WO | 2010062679 | 6/2010 |

OTHER PUBLICATIONS

European Application # 201668019 search report dated May 29, 2020.

(Continued)

*Primary Examiner* — Natasha W Cosme
(74) *Attorney, Agent, or Firm* — Kligler & Associates Patent Attorneys Ltd

(57) ABSTRACT

Packet processing apparatus includes a first interface coupled to a host processor and a second interface configured to transmit and receive data packets to and from a packet communication network. A memory holds context information with respect to one or more flows of the data packets conveyed between the host processor and the network in accordance with a reliable transport protocol and with respect to encoding, in accordance with a session-layer protocol, of data records that are conveyed in the payloads of the data packets in the one or more flows. Processing circuitry, coupled between the first and second interfaces, transmits and receives the data packets and includes acceleration logic, which encodes and decodes the data records in accordance with the session-layer protocol using the context information while updating the context information in accordance with the serial numbers and the data records of the transmitted data packets.

26 Claims, 6 Drawing Sheets

(51) Int. Cl.
  *H04L 12/931* (2013.01)
  *H04L 29/08* (2006.01)
  *H04L 12/851* (2013.01)
  *H04L 12/00* (2006.01)
  *H04L 12/413* (2006.01)

(52) U.S. Cl.
  CPC .... *H04L 29/06095* (2013.01); *H04L 47/2483* (2013.01); *H04L 49/355* (2013.01); *H04L 63/0272* (2013.01); *H04L 63/0485* (2013.01); *H04L 63/166* (2013.01); *H04L 69/163* (2013.01); *H04L 69/22* (2013.01); *H04L 69/326* (2013.01)

(58) Field of Classification Search
  CPC ............. H04N 19/89; H04N 21/41407; H04N 21/4382; H04N 21/6131; H04N 21/64322
  See application file for complete search history.

(56) References Cited

U.S. PATENT DOCUMENTS

| | | |
|---|---|---|
| 8,006,297 B2 | 8/2011 | Johnson et al. |
| 8,103,785 B2 | 1/2012 | Crowley et al. |
| 8,824,492 B2 | 9/2014 | Wang et al. |
| 9,038,073 B2 | 5/2015 | Kohlenz et al. |
| 9,678,818 B2 | 6/2017 | Raikin et al. |
| 9,904,568 B2 | 2/2018 | Vincent et al. |
| 10,078,613 B1 | 9/2018 | Ramey |
| 10,120,832 B2 | 11/2018 | Raindel et al. |
| 10,152,441 B2 | 12/2018 | Liss et al. |
| 10,210,125 B2 | 2/2019 | Burstein |
| 10,218,645 B2 | 2/2019 | Raindel et al. |
| 10,423,774 B1 | 4/2019 | Zelenov et al. |
| 10,382,350 B2 | 8/2019 | Bohrer et al. |
| 2003/0023846 A1 | 1/2003 | Krishna et al. |
| 2004/0039940 A1 | 2/2004 | Cox et al. |
| 2004/0057434 A1 | 3/2004 | Poon et al. |
| 2004/0158710 A1 | 8/2004 | Buer et al. |
| 2005/0102497 A1 | 5/2005 | Buer |
| 2005/0198412 A1 | 9/2005 | Pedersen et al. |
| 2006/0095754 A1 | 5/2006 | Hyder et al. |
| 2006/0104308 A1 | 5/2006 | Pinkerton et al. |
| 2008/0147822 A1 | 6/2008 | Benhase et al. |
| 2009/0086736 A1 | 4/2009 | Foong et al. |
| 2009/0106771 A1 | 4/2009 | Benner et al. |
| 2009/0319775 A1 | 12/2009 | Buer et al. |
| 2009/0328170 A1 | 12/2009 | Williams et al. |
| 2010/0228962 A1 | 9/2010 | Simon et al. |
| 2012/0314709 A1 | 12/2012 | Post et al. |
| 2013/0080651 A1 | 3/2013 | Pope et al. |
| 2013/0125125 A1 | 5/2013 | Karino et al. |
| 2013/0142205 A1 | 6/2013 | Munoz |
| 2013/0263247 A1 | 10/2013 | Jungck et al. |
| 2013/0276133 A1 | 10/2013 | Hodges et al. |
| 2013/0329557 A1* | 12/2013 | Petry ................... H04L 63/0428 370/235 |
| 2013/0347110 A1 | 12/2013 | Dalal |
| 2014/0129741 A1 | 5/2014 | Shahar et al. |
| 2014/0185616 A1 | 7/2014 | Bloch et al. |
| 2014/0254593 A1 | 9/2014 | Mital et al. |
| 2014/0282050 A1 | 9/2014 | Quinn et al. |
| 2014/0282561 A1 | 9/2014 | Holt et al. |
| 2015/0100962 A1 | 4/2015 | Morita et al. |
| 2015/0288624 A1 | 10/2015 | Raindel et al. |
| 2015/0347185 A1 | 12/2015 | Holt et al. |
| 2015/0355938 A1 | 12/2015 | Jokinen et al. |
| 2016/0132329 A1 | 5/2016 | Gupte et al. |
| 2016/0226822 A1 | 8/2016 | Zhang et al. |
| 2016/0330112 A1 | 11/2016 | Raindel et al. |
| 2016/0330301 A1* | 11/2016 | Raindel ................... H04L 63/04 |
| 2016/0342547 A1 | 11/2016 | Liss et al. |
| 2016/0350151 A1 | 12/2016 | Zou et al. |
| 2016/0378529 A1 | 12/2016 | Wen |
| 2017/0075855 A1 | 3/2017 | Sajeepa et al. |
| 2017/0180273 A1 | 6/2017 | Daly et al. |
| 2017/0237672 A1 | 8/2017 | Dalal |
| 2017/0264622 A1 | 9/2017 | Cooper et al. |
| 2017/0286157 A1 | 10/2017 | Hasting et al. |
| 2017/0371835 A1 | 12/2017 | Ranadive et al. |
| 2018/0004954 A1 | 1/2018 | Liguori et al. |
| 2018/0067893 A1 | 3/2018 | Raindel et al. |
| 2018/0109471 A1 | 4/2018 | Chang et al. |
| 2018/0114013 A1 | 4/2018 | Sood et al. |
| 2018/0167364 A1 | 6/2018 | Dong et al. |
| 2018/0210751 A1 | 7/2018 | Pepus et al. |
| 2018/0219770 A1 | 8/2018 | Wu et al. |
| 2018/0219772 A1 | 8/2018 | Koster et al. |
| 2018/0246768 A1 | 8/2018 | Palermo et al. |
| 2018/0262468 A1 | 9/2018 | Kumar et al. |
| 2018/0285288 A1 | 10/2018 | Bernat et al. |
| 2018/0329828 A1 | 11/2018 | Apfelbaum et al. |
| 2019/0012350 A1 | 1/2019 | Sindhu et al. |
| 2019/0026157 A1 | 1/2019 | Suzuki et al. |
| 2019/0116127 A1 | 4/2019 | Pismenny et al. |
| 2019/0163364 A1 | 5/2019 | Gibb et al. |
| 2019/0173846 A1 | 6/2019 | Patterson et al. |
| 2019/0250938 A1 | 8/2019 | Claes et al. |
| 2020/0012604 A1 | 1/2020 | Agarwal |
| 2020/0026656 A1 | 1/2020 | Liao et al. |
| 2020/0401440 A1 | 12/2020 | Sankaran et al. |

OTHER PUBLICATIONS

Burstein, "Enabling Remote Persistent Memory", SNIA-PM Summit, pp. 1-24, Jan. 24, 2019.
Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing But Net", SNIA-Storage developer conference, pp. 1-30, year 2017.
Microsoft, "Project Brainwave", pp. 1-5, year 2019.
U.S. Appl. No. 16/012,826 office action dated Oct. 1, 2019.
U.S. Appl. No. 16/202,132 office action dated Apr. 2, 2020.
International Application # PCT/IB2018/058705 search report dated Feb. 18, 2019.
International Application # PCT/IB2018/059824 search report dated Mar. 22, 2019.
U.S. Appl. No. 15/701,459 office action dated Dec. 27, 2018.
Dierks et al., "The Transport Layer Security (TLS) Protocol Version 1.2", Request for Comments: 5246, pp. 1-104, Aug. 2008.
Turner et al., "Prohibiting Secure Sockets Layer (SSL) Version 2.0", Request for Comments: 6176, pp. 1-4, Mar. 2011.
Rescorla et al., "The Transport Layer Security (TLS) Protocol Version 1.3", Request for Comments: 8446, pp. 1-160, Aug. 2018.
Comer., "Packet Classification: A Faster, More General Alternative to Demultiplexing, The Internet Protocol Journal, vol. 15, No. 4, pp. 12-22, Dec. 2012.
U.S. Appl. No. 15/146,013 Office Action dated Dec. 19, 2018.
Salowey et al., "AES Galois Counter Mode (GCM) Cipher Suites for TLS", Request for Comments: 5288, pp. 1-8, Aug. 2008.
Shirey., "Internet Security Glossary, Version 2", Request for Comments 4949, pp. 1-365, Aug. 2007.
Information Sciences Institute, "Transmission Control Protocol; DARPA Internet Program Protocol Specification", Request for Comments 793, pp. 1-90, Sep. 1981.
InfiniBand TM Architecture Specification vol. 1, Release 1.3, pp. 1-1842, Mar. 3, 2015.
Stevens., "TCP Slow Start, Congestion Avoidance, Fast Retransmit, and Fast Recovery Algorithms", Request for comments 2001, pp. 1-6, Jan. 1997.
Metronome Systems, Inc., "Open vSwitch Offload and Acceleration with Agilio® CX SmartNICs", White Paper, pp. 1-7, Mar. 2017.
PCI Express® Base Specification, Revision 3.0, pp. 1-860, Nov. 10, 2010.
Bohrer et al., U.S. Appl. No. 15/701,459, filed Sep. 12, 2017.
Menachem et al., U.S. Appl. No. 15/841,339, filed Dec. 14, 2017.
Levi et a;., U.S. Appl. No. 16/012,826, filed Jun. 20, 2018.

(56) References Cited

OTHER PUBLICATIONS

U.S. Appl. No. 16/827,912 office action dated Jan. 1, 2021.

* cited by examiner

COMPUTATIONAL ACCELERATOR FOR PACKET PAYLOAD OPERATIONS

CROSS-REFERENCE TO RELATED APPLICATION

This application claims the benefit of U.S. Provisional Patent Application 62/572,578, filed Oct. 16, 2017, which is incorporated herein by reference.

FIELD OF THE INVENTION

The present invention relates generally to computer systems, and particularly to computational accelerator devices and methods.

BACKGROUND

Computational accelerators are commonly used in offloading computation-intensive tasks from the central processing unit (CPU, also referred to as the host processor) of a host computer. Such accelerators typically comprise hardware logic that is dedicated to a particular type of operations, such as cryptography or data compression, and can thus perform these operations much faster than software-driven computation by the CPU. When an accelerator is to be used in processing the payloads of a stream of data packets, however, it may have to implement not only its intended computational function, but also packet header processing and communication protocol logic.

For example, U.S. Patent Application Publication 2016/0330112, whose disclosure is incorporated herein by reference, describes a data processing device that includes a first packet communication interface for communication with at least one host processor via a network interface controller (NIC) and a second packet communication interface for communication with a packet data network. A memory holds a flow state table containing context information with respect to multiple packet flows conveyed between the host processor and the network via the first and second packet communication interfaces. Acceleration logic, coupled between the first and second packet communication interfaces, performs computational operations on payloads of packets in the multiple packet flows using the context information in the flow state table.

SUMMARY

Embodiments of the present invention that are described hereinbelow provide improved devices and methods for computational acceleration in a computer system.

There is therefore provided, in accordance with an embodiment of the invention, packet processing apparatus, including a first interface configured to be coupled to a host processor and a second interface configured to transmit and receive data packets, including respective headers and payloads, to and from a packet communication network. A memory is configured to hold context information with respect to one or more flows of the data packets conveyed from the host processor to the network via the apparatus in accordance with a reliable transport protocol, which assigns respective serial numbers to the data packets in each of the flows, and with respect to encoding, in accordance with a session-layer protocol, of data records that are conveyed in the payloads of the data packets in the one or more flows.

Processing circuitry is coupled between the first and second interfaces and configured to transmit the data packets through the second interface to the packet communication network in accordance with instructions from the host processor, and includes acceleration logic, which is configured to encode the data records in accordance with the session-layer protocol using the context information while updating the context information in accordance with the serial numbers and the data records of the transmitted data packets. The acceleration logic is configured, upon receiving an instruction from the host processor to retransmit a data packet, to reconstruct the context information with respect to the data packet, to re-encode a payload of the data packet using the reconstructed context information, and to retransmit the data packet to the packet communication network.

In some embodiments, at least some of the data records have respective lengths that span multiple consecutive data packets, and the acceleration logic is configured, in response to receiving the instruction, to reconstruct the context data and re-encode a part of a data record that is to be retransmitted in the data packet. In a disclosed embodiment, the acceleration logic is configured to reconstruct the context data using metadata concerning the data record that was transmitted in one or more of the data packets in the flow that preceded the data packet that is to be retransmitted.

Additionally or alternatively, the acceleration logic is configured to receive the instruction to retransmit the data packet after having transmitted one or more subsequent data packets in the flow to the network, and to reconstruct a first context for use in re-encoding the payload of the data packet that is to be retransmitted while saving a second context that was updated with respect to the one or more subsequent data packets, and to resume encoding the data records using the second context after retransmission of the data packet.

In a disclosed embodiment, the reliable transport protocol includes a Transmission Control Protocol (TCP). Additionally or alternatively, encoding the data records includes encrypting the data records in accordance with the session-layer protocol, such as a Transport Layer Security (TLS) protocol.

There is also provided, in accordance with an embodiment of the invention, packet processing apparatus, including a first interface configured to be coupled to a host processor having a host memory and a second interface configured to transmit and receive data packets, including respective packet headers and payloads, to and from a packet communication network. A memory is configured to hold context information with respect to one or more flows of the data packets conveyed from the network to the host processor via the apparatus in accordance with a reliable transport protocol, which assigns respective serial numbers to the data packets in each of the flows, and with respect to encoding, in accordance with a session-layer protocol, of data records that are conveyed in the payloads of the data packets in the one or more flows.

Processing circuitry is coupled between the first and second interfaces and includes acceleration logic, which is configured to decode the data records in accordance with the session-layer protocol using the context information while updating the context information in accordance with the serial numbers and the data records of the received data packets, whereby the processing circuitry writes the decoded data records through the first interface to the host memory. The acceleration logic is configured, upon receiving, in a given flow, a data packet containing a serial number that is out of order with respect to a previous packet in the given flow, to reconstruct the context information and to apply the reconstructed context information in decoding the data records in subsequent data packets in the given flow.

In a disclosed embodiment, the processing circuitry is configured to write the data packets received in the given flow starting from the data packet containing the serial number that is out of order to the host memory without decoding the data records until the acceleration logic has completed reconstructing the context information, wherein the host processor decodes the data records that have not been decoded by the acceleration logic.

In some embodiments, the data records include record headers, and the acceleration logic is configured to search the payloads of one or more of the data packets in the given flow beginning with the data packet containing the serial number that is out of order in order to find at least one of the record headers, and to reconstruct the context information using the at least one of the record headers. In some of these embodiments, at least some of the data records have respective that span multiple consecutive data packets, and the acceleration logic is configured to search for the at least one of the record headers over a sequence of the data packets in the given flow. In a disclosed embodiment, the record headers contain a length field containing a value indicating a length of the records, and the acceleration logic is configured to identify a record header of a first record in one of the packets in the sequence, to read a value of the length field from the identified record header, and to apply the value of the length field in finding and verifying a second record in a subsequent packet in the sequence.

In some embodiments, the encoded data records are encrypted in accordance with the session-layer protocol, and the acceleration logic is configured to decrypt the data records.

There is additionally provided, in accordance with an embodiment of the invention, a method for packet processing, which includes receiving instructions via a first interface from a host processor with respect to data packets, including respective headers and payloads, that are to be transmitted to a packet communication network via a second interface. Context information is stored in a memory with respect to one or more flows of the data packets that are transmitted to the network via the second interface in accordance with a reliable transport protocol, which assigns respective serial numbers to the data packets in each of the flows, and with respect to encoding, in accordance with a session-layer protocol, of data records that are conveyed in the payloads of the data packets in the one or more flows.

In response to the instructions from the host processor, acceleration logic coupled between the first and second interfaces is applied to encode the data records in accordance with the session-layer protocol using the context information, while updating the context information in accordance with the serial numbers and the data records of the transmitted data packets. The data packets containing the encoded data records are transmitted through the second interface to the packet communication network in accordance with the instructions from the host processor. Upon receiving an instruction from the host processor to retransmit a data packet, the acceleration logic is applied to reconstruct the context information with respect to the data packet, re-encode a payload of the data packet using the reconstructed context information, and retransmit the data packet through the second interface to the packet communication network.

There is further provided, in accordance with an embodiment of the invention, a method for packet processing method, which includes receiving instructions via a first interface from a host processor, having a host memory, with respect to data packets, including respective headers and payloads, that are received from a packet communication network via a second interface. Context information is stored in a memory with respect to one or more flows of the data packets that are received from the network via the second interface in accordance with a reliable transport protocol, which assigns respective serial numbers to the data packets in each of the flows, and with respect to encoding, in accordance with a session-layer protocol, of data records that are conveyed in the payloads of the data packets in the one or more flows.

In response to the instructions from the host processor, acceleration logic coupled between the first and second interfaces is applied to decode the data records in accordance with the session-layer protocol using the context information, while updating the context information in accordance with the serial numbers and the data records of the received data packets. The decoded data records are written through the first interface to the host memory. Upon receiving, in a given flow, a data packet containing a serial number that is out of order with respect to a previous packet in the given flow, the acceleration logic is applied to reconstruct the context information and to apply the reconstructed context information in decoding the data records in subsequent data packets in the given flow.

The present invention will be more fully understood from the following detailed description of the embodiments thereof, taken together with the drawings in which:

DETAILED DESCRIPTION OF EMBODIMENTS

Overview

Figure 1:
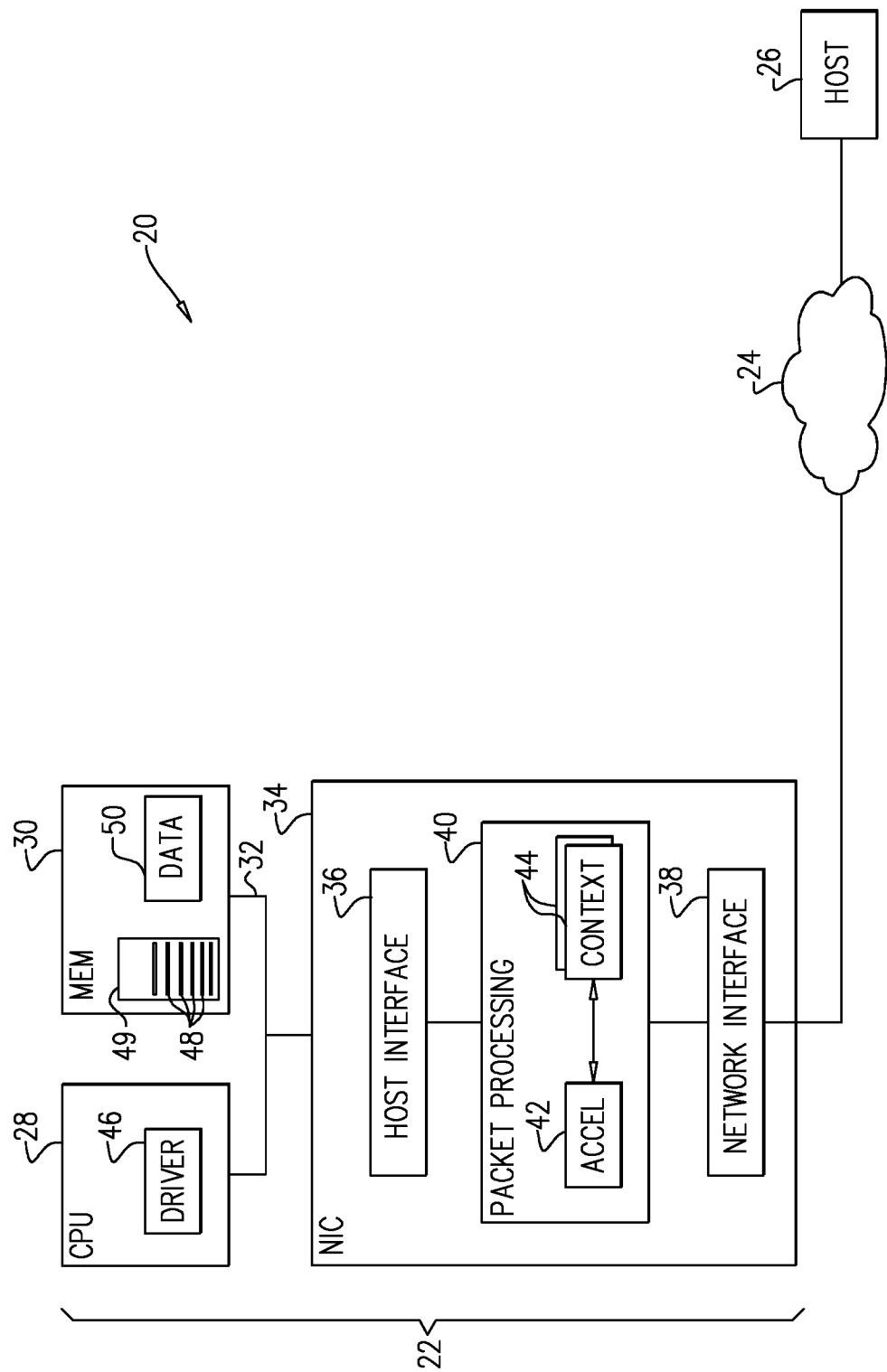
FIG. 1 is block diagram that schematically illustrates a computer system with a computational accelerator, in accordance with an embodiment of the invention.

As noted earlier, computational accelerators for packet processing, such as a cryptographic accelerator, are often required to implement not only their intended computational functions, but also packet header processing and communication protocol logic. For stateless link-layer and network-layer protocols, such as Ethernet and Internet Protocol (IP), this logical burden is manageable. Connection-oriented transport protocols, such as the Transmission Control Protocol (TCP), however, are much more complex. Although hardware implementations of TCP processing functions are known in the art, they are costly in terms of chip "real estate" and limited in the number of flows they can support. As a result of these issues, cryptographic operations involved in session-layer encryption solutions, such as the Secure Sockets Layer (SSL) and Transport Layer Security (TLS), are generally performed in software on the host CPU, rather than offloaded to a hardware accelerator.

The accelerator described in the above-mentioned US 2016/0330112 addresses these limitations by holding computational context information, including cryptographic variables, in a "flow state table" in local memory, and updating the table as required. The table contains an entry for each flow that the host processor chooses to pass to the accelerator for processing. Each flow corresponds, for example, to a respective TCP connection, and the accelerator handles multiple flows in parallel on the fly. As long as packets are received in order, this accelerator relieves the host entirely of the burden of cryptographic computations, while reverting to host software handling when transport protocol irregularities are encountered. Because of the reliance on host software for handling irregularities, however, the accelerator of US 2016/0330112 imposes a substantial burden on the CPU when packet retransmission is required in a transmitted (Tx) flow or when a packet is lost or arrives out of order in a received (Rx) flow.

Embodiments of the present invention that are described herein address these problems by enabling the accelerator to maintain and recover the flow state and computational context independently of the CPU. For this purpose, the accelerator makes use of protocol information contained in the packet flow itself, including both transport-layer information in the packet headers and session-layer framing information that can be found in the packet payloads. For example, at the transport layer, the accelerator can track and make use of the TCP serial numbers; while at the session layer, the accelerator can detect and use the version number and length fields of (session-layer) TLS records. These capabilities of the accelerator thus reduce the burden on the CPU, as well as conserving communication bandwidth on the host bus between the accelerator and the CPU.

The present embodiments are directed particularly to computational accelerators for use in encoding payload data in accordance with a session layer protocol, for transmission over a network in packet flows that are transmitted using a reliable transport protocol, as well as in receiving and decoding such payload data. The term "reliable transport protocol" refers to packet communication protocols in Layer 4 of the Open Systems Interconnection (OSI) model, such as TCP, which verify reception of packets and include a mechanism for retransmission of packets that are not received at the intended destination. Such protocols typically assign to the packets respective serial numbers, which are incorporated in the packet headers.

The term "session-layer protocol" is used herein to refer to protocols that run above the transport layer and are used by the transmitting and the receiving computers in establishing the context for a communication session that can extend over multiple packets. In the present case, this context is used by the transmitting computer in framing and encoding data records that are to be conveyed in the payloads of the packets in a reliable transport flow. The term "record" refers to a segment of data of a specified length, with the possible addition of metadata pertaining to the data segment. (This is the meaning of the term "record" that is used in TLS specifications.) The term "encoding" refers to computational operations that are applied to the data records before transmission by the transmitting computer, using the session-layer context, while "decoding" refers to the reverse operations that are performed by the receiving computer. In the embodiments that are described below, the encoding comprises an encryption of the data in each record, for example, using the TLS protocol, while decoding comprises decryption. In other embodiments, the encoding operations may alternatively or additionally comprise computation of a digest or digital signature over a data frame; data compression; or other computations that depend on the session context.

In some session-layer protocols, the data records can have respective lengths that are larger than the maximum packet payload size, meaning that at least some of the encoded data records will span multiple consecutive data packets. Thus, in order to encode a given data record, the session context information must be maintained and updated over multiple consecutive data packets in order. As a result, when a packet is to be transmitted out of order (typically in response to a retransmission request) or is received out of order, the context information may be lost. Embodiments of the present invention provide computational accelerators and methods for operations of such accelerators that are capable of autonomously reconstructing the lost context information in such situations.

In the disclosed embodiments, data encoding and decoding computations are offloaded from the host processor to dedicated acceleration logic in packet processing apparatus, such as a NIC or "bump-in-the-wire" device. The packet processing apparatus has an interface that is coupled to the host processor and another interface that transmits and receives data packets to and from a packet communication network. Processing circuitry in the apparatus receives and transmits the data packets between the interfaces in accordance with instructions from the host processor.

For purposes of the computational offload, the apparatus includes a memory, which holds context information (as defined above) with respect to flows of the data packets conveyed between the host processor and the network via the apparatus in accordance with a reliable transport protocol, and with respect to encoding, in accordance with a session-layer protocol, of data records that are conveyed in the payloads of the data packets. The acceleration logic encodes or decodes the data records in accordance with the session-layer protocol using the context information while updating the context information in accordance with the serial numbers and the data records of the data packets that it processes.

When the context is lost due to an out-of-order packet, in either a transmitted or a received packet flow, the acceleration logic reconstructs the context information autonomously, on the basis of the out-of-order packet itself and/or other packets in the same flow. The reconstruction is "autonomous" in the sense that the acceleration logic itself locates and extracts the necessary values from the fields of the packet headers and payloads, and then computes the context information on this basis, rather than requesting or receiving the reconstructed context information from the host processor. In some embodiments, the acceleration logic may ask the host processor to verify certain information that it has attempted to reconstruct, as explained below, or to decode the payloads of packets that are received while the acceleration logic is in the process of context reconstruction. Beyond these limitations, there is no need for the host processor to be involved in context reconstruction or to save packets for subsequent retransmission or decoding by the acceleration logic.

The embodiments described below relate specifically to acceleration of encryption and decryption in accordance with the TLS protocol. The principles of the present invention, however, may similarly be applied, mutatis mutandis, in accelerating other sorts of record-based protocols that run over a reliable transport protocol, such as the Internet Small Computer Systems Interface (iSCSI). Furthermore, although the description below relates mainly to cryptographic operations, the principles of the present invention may similarly be applied in other sorts of computations, such as data compression and decompression and pattern matching.

System Description

FIG. 1 is block diagram that schematically illustrates a computer system 20 with a computational accelerator 42, in accordance with an embodiment of the invention. System 20 comprises a host computer 22, which is connected to communicate over a packet data network 24 with other computers, such as a host computer 26. Computer 22 comprises a CPU 28 with a host memory 30, typically comprising random-access memory (RAM), which are connected to a NIC 34 by a suitable bus 32, such as a PCI Express® (PCIe®) bus. In the present example, network 24 is assumed to be an Ethernet network, operating in accordance with the IEEE 802.3 family of standards, although the principles of the present invention are similarly applicable, mutatis mutandis, to networks of other types.

NIC 34 comprises a network interface 38 in the form of one or more physical network ports configured for connection to network 24. NIC 34 is connected to bus 32 through a host interface 36, comprising a suitable PCIe interface, for example. Processing circuitry 40 in NIC 34 is connected between network interface 28 and host interface 36 and handles both incoming packets received from network 24 and outgoing packets for transmission to network 24, as described in greater detail hereinbelow.

In the pictured embodiment, accelerator 42 is implemented as a part of packet processing circuitry 40 and handles encryption and decryption functions in accordance with the TLS protocol, in response to instructions conveyed by driver software 46 running on CPU 28. For this purpose, accelerator 42 maintains context data 44 in a memory for each TCP flow that it has been instructed to handle. Context data 44 may be held in a memory within NIC 34 and/or on a separate, dedicated memory chip and/or in a partition of host memory 30 that is assigned for this purpose. The context data for each such flow include:

The TCP packet context, including the 5-tuple of fields in the IP packet header (IP source and destination addresses, IP source and destination ports, and the protocol) and the next expected TCP packet serial number (PSN).
The TLS record context, including the record length and sequence number of the current record.
The cryptographic state, including the cryptographic keys, initialization vector (IV) and current state of the cipher.

These context values are initially downloaded to NIC 34 by software 46 for each new TLS session (transmitted or received) that the NIC is to handle. The values are then updated by accelerator 42 each time a new packet in the flow is transmitted or received. Only a subset of the values is actually updated, however, such as the TCP PSN and cipher state for each packet, and the TLS sequence number of each new record. The other context values are generally constant over the entire session. Therefore, when context reconstruction is required, accelerator 42 will generally have to find and recover only the relevant values, and not all of the context data 44 for the flow in question.

For the sake of clarity, the physical components of NIC 34 are shown in FIG. 1 as multiple, separate functional blocks. In practice, however, these components are typically (although not necessarily) implemented as hardware and firmware components within a single integrated circuit chip or chipset, possibly together with CPU 28, as well. Processing circuitry 40 typically comprises hardware logic circuits, which may be programmable or hard-wired and are configured to carry out the functions described herein, as well as other packet processing functions that are known in the art. Additionally or alternatively, at least some of these functions can be carried out by an embedded processor in NIC 34 under that control of software or firmware.

Accelerator 42 typically comprises control logic, which is responsible for packet handling and data transfer within the accelerator, and an arithmetic logic unit, which performs cryptographic computational operations on payloads of outgoing and incoming packets that are received through interfaces 36 and 38. In the present embodiment, these operations include encryption and decryption of messages, as well as recovery of context data 44 in case of retransmission or packet loss. Details of these operations for the case of TLS are presented hereinbelow. Circuitry that can be used in implementing such steps is known in the art and is beyond the scope of the present description.

To transmit data packets to network, communication software, such as a TCP/IP protocol stack, running on CPU 28 writes descriptors 48 to a queue 49. The descriptors (also referred to as work requests or work queue elements, for example) specify the location of packet data in a buffer 50 in memory 30 and operations to be applied in transmission of the packets, such as encryption of TLS records to be carried in the packet payloads. Although the large majority of the packets will be transmitted with their TCP serial numbers in order, CPU 28 will occasionally post a descriptor 48 calling for retransmission of a previous packet, for example, when host computer 26 has failed to acknowledge the packet. In this case, the descriptor may contain additional information to assist accelerator 42 in reconstructing context data 44 that will be needed for encryption of the transmitted packets, as explained in greater detail hereinbelow.

When NIC 34 receives encrypted packets from network 24, accelerator 42 applies appropriate context data 44 in decrypting the packet payloads. Processing circuitry 40 then writes the decrypted packets to a specified location in buffer 50. As in the case of packet transmission, packets are generally received from network 24 in serial order within their respective flows (for example, flows of TCP packets), so that accelerator 42 is able to maintain valid context data 44 from one packet to the next. When a packet in a given flow is received out of order, accelerator 42 searches the payloads of the packets in the given flow (typically beginning with the out-of-order packet) in order to find TLS record headers, and then reconstructs context data 44 using these headers. These search and reconstruction functions are described further hereinbelow.

Once context data 44 has been reconstructed, accelerator 42 can resume decryption of the received data packets. In the meanwhile, until the reconstruction has been completed, processing circuitry 40 will typically signal CPU 28 that decryption has been suspended, and will write the data packets received in the flow in question, starting from the out-of-order packet, to buffer 50 in host memory 30 without decryption. CPU 28 will then decode the encrypted data records in software. Although this approach imposes a transient computational burden on the CPU, it avoids the memory and communication burdens of buffering and replaying these packets through the accelerator.

Although FIG. 1 shows one possible implementation of accelerator 42, other implementations will be apparent to those skilled in the art after reading the present description and are considered to be within the scope of the present invention. For example, accelerator 42 may be implemented in a bump-in-the-wire configuration, as described in the above-mentioned US 2016/0330112, rather than as a part of the NIC.

Processing of Transmitted Packets

Figure 2:
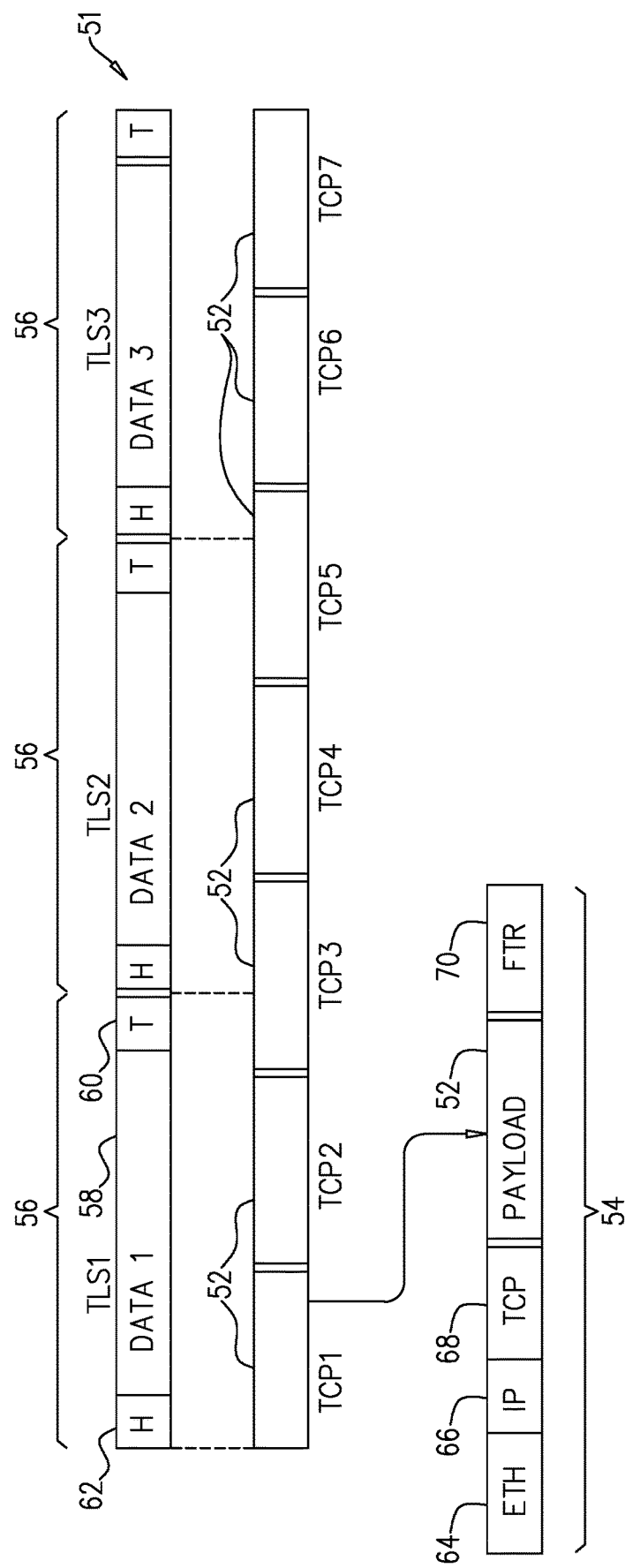
FIG. 2 is a block diagram that schematically illustrates framing of data processed by a computational accelerator in a sequence of packets, in accordance with an embodiment of the invention.

FIG. 2 is a block diagram that schematically illustrates framing of a stream of data 51 processed by accelerator 42 and transmitted by NIC 34 in a sequence of packets 54, in accordance with an embodiment of the invention. Data 51 in this example are encapsulated and encrypted in a sequence of records 56, in accordance with the TLS protocol and record format, as described for example in a number of requests for comments (RFCs) of the Internet Engineering Task Force (IETF), including RFC 5246 (2008), RFC 6176 (2011) and RFC 8446 (2018), which are incorporated herein by reference. Following these operations, TLS records 56 are transmitted in payloads 52 of a sequence of TCP packets 54.

Software running on CPU 28 divides the stream of data 51, which is initially held in memory 30, into a sequence of frames 58 of a given length, which can be up to 16 KB. The software also defines packets 54, including the length of payloads 52 and some or all of the fields in the packet headers. Driver software 46 writes descriptors 48 to queue 49, specifying the addresses and lengths of data frames 58 that processing circuitry 40 is to read from memory 30, as well as packet parameters, such as the TCP payload size and packet serial numbers. Because the size of frames 58 is greater than the size of payloads 52, the lengths of data records 56 span multiple consecutive packets 54. Thus, for example, the data record marked TLS2 spans the payloads of TCP packets TCP3, TCP4 and TCP5.

Upon receiving a descriptor 48 identifying data 51 and corresponding packets 54 for transmission, accelerator 42 reads each successive frame 58, adds an (optional) authentication tag 60, and encrypts the data as specified by the applicable TLS standards, using context data 44. The context data include both the encryption key and other parameters that are used in computing the cipher. Either CPU 28 or accelerator 42 also adds a header 62 to each record 56, including a version field and a record length field, in accordance with TLS standards. (For TLS 1.3 and later versions, the version field is set to 0x0303.) The algorithms for encryption and decryption that are applied by accelerator 42 depend on the TLS version. For example, in TLS 1.2, using the Advanced Encryption Standard (AES) with a Galois/Counter Mode (GCM) Cipher (AES-GCM), each TLS record contains eight bytes of an explicit initialization vector (IV) after the record header. The authentication tag appears at the end of the TLS record. Thus, each TLS record has the following form:

[1 byte type|2 byte version|2 byte length|8 byte explicit IV|length minus 16 bytes of data|16 byte authentication tag]

The IV for AES-GCM consists of four bytes of a constant implicit IV taken from the TLS context and eight bytes of explicit IV taken from each packet. The set of header fields (referred to as the AAD) used for encryption includes the TLS header followed by the TLS record sequence number, in the following form:

[1 byte type|2 byte version|2 byte length|8 byte sequence number]

As explained above, the cipher is implemented by hardware logic in accelerator 42, for example based on an algorithm that is defined by Salowey et al., in "AES Galois Counter Mode (GCM) Cipher Suites for TLS," published as RFC 5288 by the IETF (2008), which is incorporated herein by reference.

Processing circuitry 40 breaks encrypted TLS records 56 into TCP payloads 52, and inserts the payloads into successive packets 54 for transmission to network 24. In accordance with TCP/IP standards, each packet has Ethernet and IP headers 64 and 66, followed by a TCP header 68, containing the packet serial number (PSN). The updated PSN value is held in context data 44 to verify that the correct cipher state is used in encrypting each successive frame 58 of data. Processing circuitry 40 also adds a footer 70 to each packet in accordance with the applicable standards.

Figure 3:
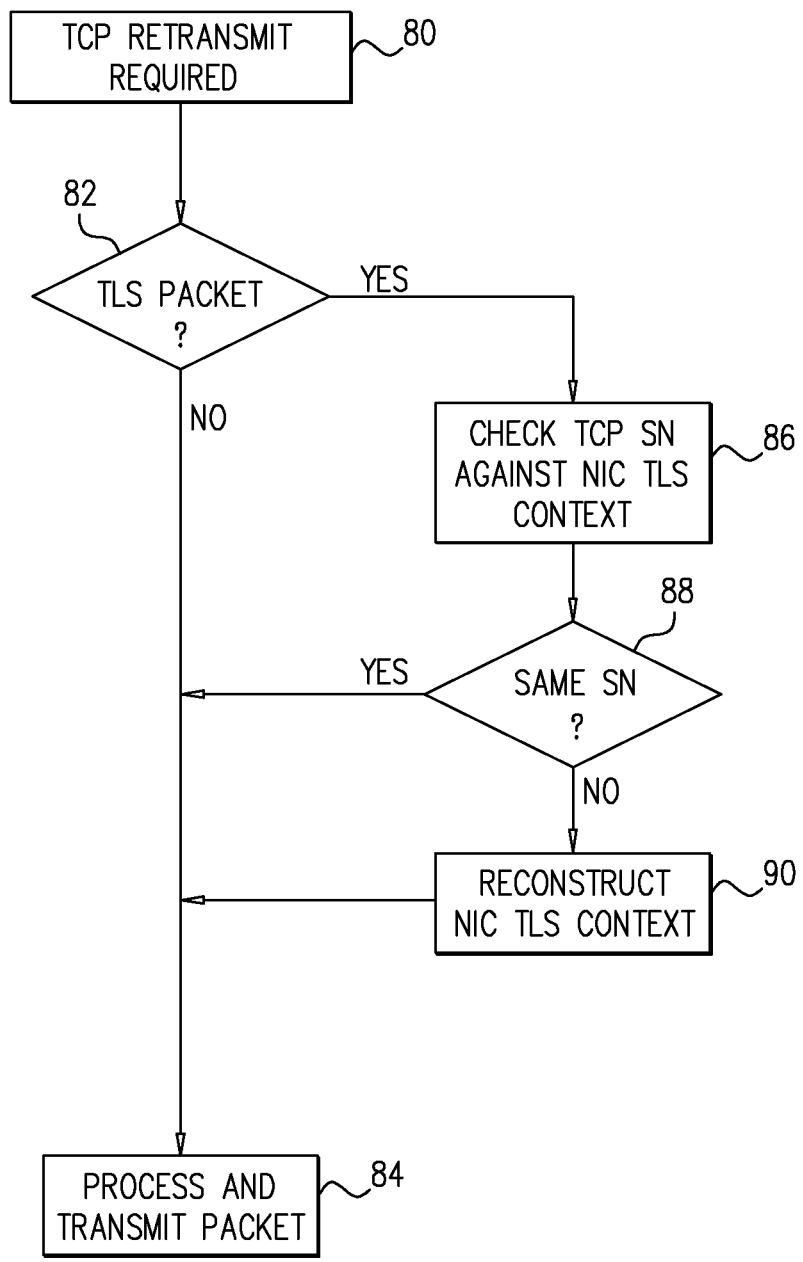
FIG. 3 is a flow chart that schematically illustrates a method for processing of a packet for retransmission to a network by a computational accelerator, in accordance with an embodiment of the invention.

FIG. 3 is a flow chart that schematically illustrates a method for processing of a packet for retransmission to network 24 by accelerator 42, in accordance with an embodiment of the invention. The method is initiated, for example, when the TCP protocol stack running on CPU 28 determines that a certain packet should be retransmitted because it was not acknowledged by the destination computer, at a retransmission requirement step 80. In this case, driver software 46 posts a descriptor 48 in queue 49, identifying the packet that is to be retransmitted.

When descriptor 48 reaches the head of queue 49, processing circuitry 40 reads the descriptor and determines whether TLS operations are to be applied to the corresponding packet, at a TLS evaluation step 82. If not, the processing circuitry simply reads the packet data from memory 30, assembles it together with the packet header, and transmits the packet to network 24, at a packet transmission step 84.

On the other hand, if descriptor 48 calls for TLS processing, the descriptor is passed at step 82 to accelerator 42 for handling. Accelerator 42 checks the corresponding context data 44 to find the next PSN that is expected to be transmitted in the TCP/IP flow in question, at a serial number checking step 86. The accelerator compares this context value to the PSN specified in descriptor 48, at a serial number comparison step 88. When the serial numbers match, accelerator 42 can simply process and encrypt the data for retransmission using the existing context data 44, at step 84.

In many cases, however, the retransmission instructions at step 80 will reach processing circuitry 40 after accelerator 42 has already processed and transmitted one or more subsequent packets in the flow. In this case, the PSN in context data 44 will not match that specified in descriptor 48. Therefore, accelerator 42 reconstructs the applicable context in order to encrypt payload 52 of the required packet, at a context reconstruction step 90. Referring, for example, to the sequence of packets shown in FIG. 2, NIC 34 may receive an instruction to retransmit packet TCP5 after having most recently transmitted packet TCP7. In this case, accelerator 42 will have to reconstruct and use the context of record TLS2, rather than the current record TLS3. Once the context has been reconstructed, accelerator 42 can encrypt and transmit the packet to network 24 at step 84.

To reconstruct the state of context data 44 that should be used in encrypting payload 52 of packet TCP5, accelerator 42 has to refer back to the preceding part of record TLS2, which was contained in packets TCP3 and TCP4. These packets do not have to be retransmitted, but accelerator 42 must still recover the contents of header 62 and data frame 58 that they contained in order to reconstruct the encryption state. For this purpose, driver 46 may insert metadata in descriptor 48 concerning the data record that was transmitted in the preceding packets in the flow (TCP3 and TCP4 in the present example). Accelerator 42 will then be able to access, read and process the necessary data in order to reconstruct the context at step 90.

Alternatively, CPU 28 may compute and pass relevant parts of the context state to accelerator 42 directly, so that the accelerator will not have to read and process data from preceding packets. For this purpose, for example, driver 46 may place a special descriptor containing the context metadata in queue 49, prior to the descriptor instructing NIC 34 to reconstruct the packet. As another example, when accelerator 42 is configured as a bump-in-the-wire device (as in the above-mentioned US 2016/0330112), CPU 28 may transmit one or more special metadata packets, containing the context metadata, to the device. The headers of the metadata packets are marked as such, for example using a special value in the Ethertype field, which causes the accelerator to terminate the packets, and to read and use the metadata in reconstructing the context state.

After having reconstructed the TLS context at step 90 and completed the required retransmission of packets, NIC 34 will often resume the orderly transmission of packets from the point at which it left off at step 80 (assuming the TCP version supports selective retransmission). Thus, referring again to FIG. 2, after having retransmitted packet TCP5, the NIC will next transmit packet TCP8. Resumption of transmission at packet TCP8, however, requires that context data 44 be restored to the state of the context following transmission of packet TCP7.

In an embodiment of the present invention, to avoid having to reconstruct the context twice (once for packet TCP5 and then again for packet TCP8), accelerator 42 saves the context as it stood following the last packet transmitted in order (TCP7 in the present example) before beginning reconstruction of the earlier context at step 90. After the out-of-order packet has been retransmitted, accelerator 42 resumes encryption of data records 56 (beginning from packet TCP8) using the saved context. In other words, accelerator 42 may save at least two sets of context data 44 for each flow: one at the tip of the TCP window, meaning the last packet that was transmitted in order, and another context that is reconstructed for purposes of retransmission.

Processing of Received Packets

Figure 4:
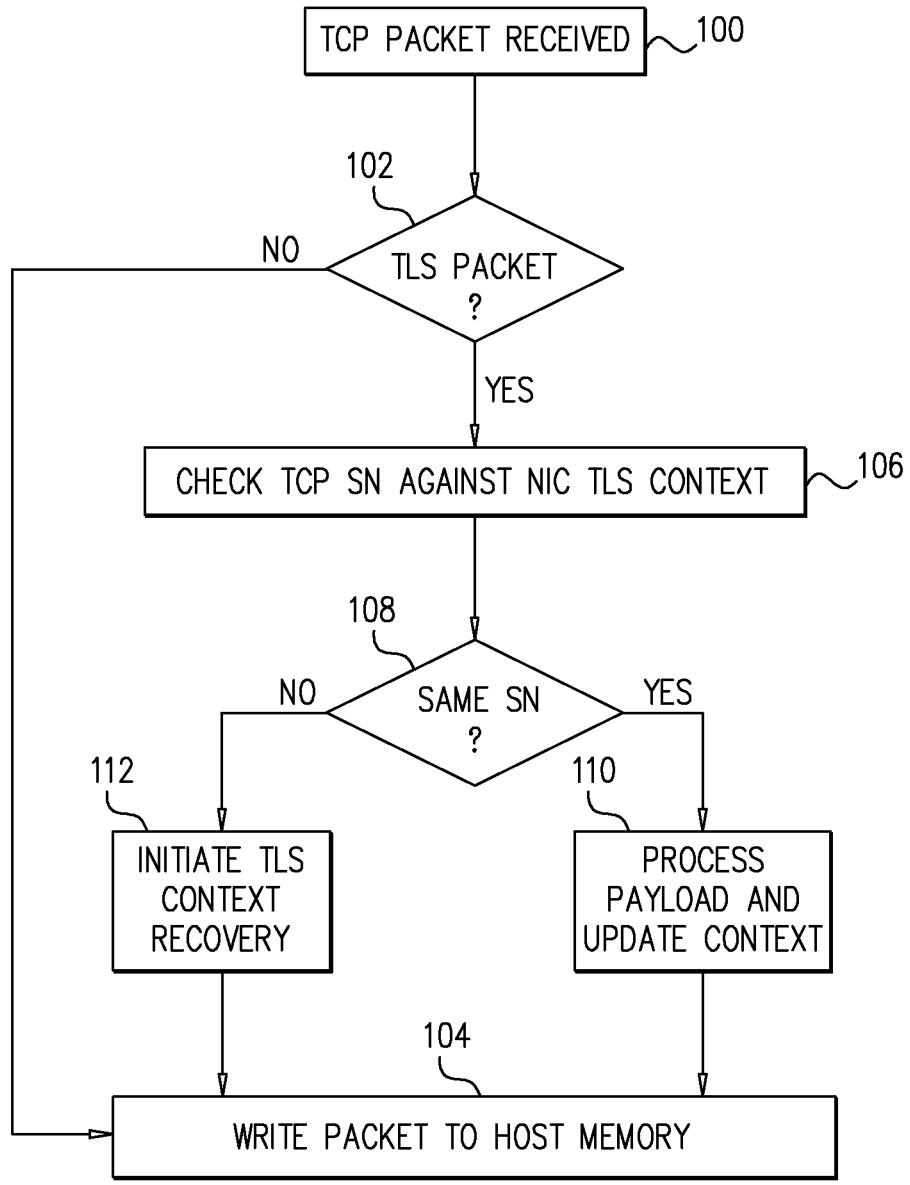
FIG. 4 is a flow chart that schematically illustrates a method for processing of a packet received from a network by a computational accelerator, in accordance with an embodiment of the invention.

FIG. 4 is a flow chart that schematically illustrates a method for processing of a packet received from network 24 by accelerator 42, in accordance with an embodiment of the invention. The method in this case is initiated each time processing circuitry 40 in NIC 34 receives a TCP packet from network 24 through network interface 38, at a packet reception step 100. Processing circuitry 40 checks the packet to determine whether payload 52 contains TLS data, at a TLS checking step 102. If not, the processing circuitry writes the packet via host interface 36 to the appropriate data buffer 50 in memory 30, at a data writing step 104, without invoking accelerator 42. (Processing circuitry 40 typically carries out other packet processing functions, as well, but they are beyond the scope of the present description.)

When a TLS packet is identified at step 102, accelerator 42 reads the TCP PSN from header 68 and reads the expected PSN value for this flow from the applicable context data 44, at a serial number checking step 106. Accelerator compares these PSN values at a serial number matching step 108. If the PSN of the received packet matches the expected value, accelerator decrypts packet payload 52 and updates the appropriate values in context data 44, at a decryption step 110. Processing circuitry 40 then writes the packet with the decrypted payload to memory 30 at step 104. As long as the bit error rates and congestion level in network 24 are within reasonable bounds, the large majority of incoming TLS packets will be handled in this manner.

On the other hand, when there is a mismatch of PSN values at step 108, accelerator 42 concludes that the packet has been received out of order. In this case, the accelerator initiates the process of reconstructing context data 44, at a context recovery step 112. The context is reconstructed by reading and searching through the header and payload fields of the current packet (containing the serial number that is out of order) and, in some cases, subsequent packets in this flow in order to extract the information required for context reconstruction. Specifically, accelerator 42 attempts to find at least one TLS record header, and reconstructs context data 44 using the information in the record header. This process of search and reconstruction is described further hereinbelow.

Once context data 44 have been reconstructed, accelerator 42 will be able to apply the context data in processing subsequent TLS packets in this flow. In the meanwhile, processing circuitry 40 may write this packet and subsequent packets in the same flow to memory 30 for decryption by CPU 28. For example, when NIC 34 fails to receive a certain packet 54 in a given flow, accelerator 42 may skip decryption of all subsequent packets until it has reached a packet that contains header 62 of the next TLS record 56. Thus, referring to FIG. 2, if packet TCP3 is lost, accelerator 42 will pass packets TCP4 and TCP5 to memory 30 without decryption. If the accelerator then succeeds in identifying and reading header 62 of record TLS3 in packet TCP5, it can reconstruct and apply the context in decrypting the payloads of packets TCP6 and TCP7.

Accelerator 42 may be able to find the location of the next header in the packet series on the basis of the TLS length field that it read from header 62 of the previous TLS record 56. The accelerator can then skip over payloads 52 of packets 54 until it has reached the expected header location. Accelerator 42 thus applies the value of the length field in finding and verifying the next record in a subsequent packet in the sequence.

In some cases, such as that illustrated in FIG. 2, TLS records 56 have respective lengths that span multiple consecutive data packets 54, and accelerator 42 may then search for the next record header 62 over a sequence of two or more packets in the flow. When accelerator 42 skips over packets to find the next record header, it may save two sets of context data 44 for the flow in question: one for the current TLS record, in which a packet was missed, and the other for the next record. When the out-of-order packet or packets are subsequently received by NIC 34 from network 24, accelerator 42 can apply the saved context data in decrypting the packets.

Additionally or alternatively, for purposes of recovering the TLS record context, accelerator 42 can calculate the correct TLS record sequence number using the AES-GCM cipher suite that is prescribed by TLS. The calculation is based on the linear structure of the GHASH function. Given the TLS session key, the initialization vector (IV), and the record payload, accelerator 42 extracts the sequence number from the set of header fields (referred to as the AAD) consisting of the TLS sequence number, type, version and record length using the following equation. This equation defines a recursive function to compute the GHASH function, which is equal to $X_{(n+m+1)}$. In this equation, $A_i$ is the $i^{th}$ block of the AAD, $C_i$ is the $i^{th}$ block of ciphertext, and H is the hash key equal to a string of 128 zero bits encrypted using the AES block function with the AES key.

$$X_i = \begin{cases} 0 & \text{for } i = 0 \\ (X_{i-1} \oplus A_i) \cdot H & \text{for } i = 1, \ldots, m-1 \\ (X_{m-1} \oplus (A_m^* \| 0^{128-c})) \cdot H & \text{for } i = m \\ (X_{i-1} \oplus C_{i-m}) \cdot H & \text{for } i = m+1, \ldots, m+n-1 \\ (X_{m+n-1} \oplus (C_n^* \| 0^{128-u})) \cdot H & \text{for } i = m+n \\ X_{m+n} \oplus (len(A) \| len(C))) \cdot H & \text{for } i = m+n+1 \end{cases}$$

Because the AAD (as defined above) contains the TLS sequence number, and all the operations to compute $X_i$ from A, H, $X_{\{i-1\}}$ and C are linear, these operations can be reversed to recover the TLS sequence number.

Figure 5:
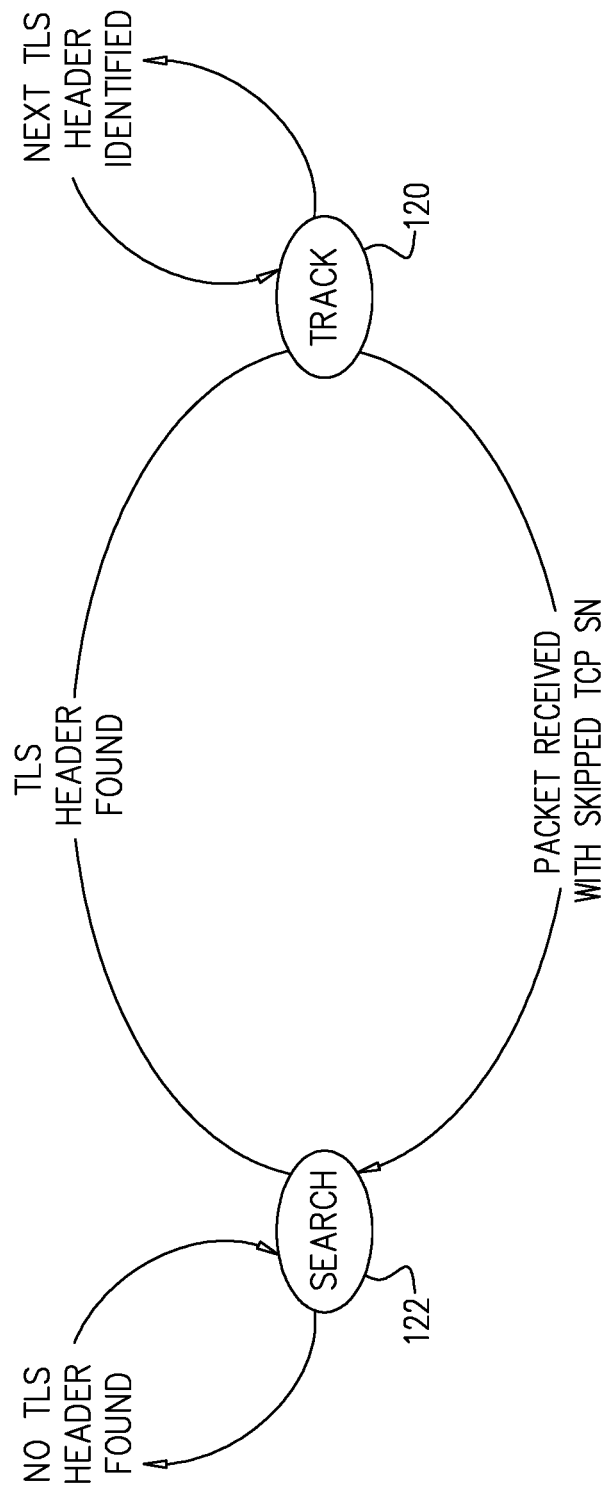
FIGS. 5 and 6 are state diagrams that schematically illustrate state machines maintained by a computational accelerator for processing of packets received from a network, in accordance with an embodiment of the invention.
Figure 6:
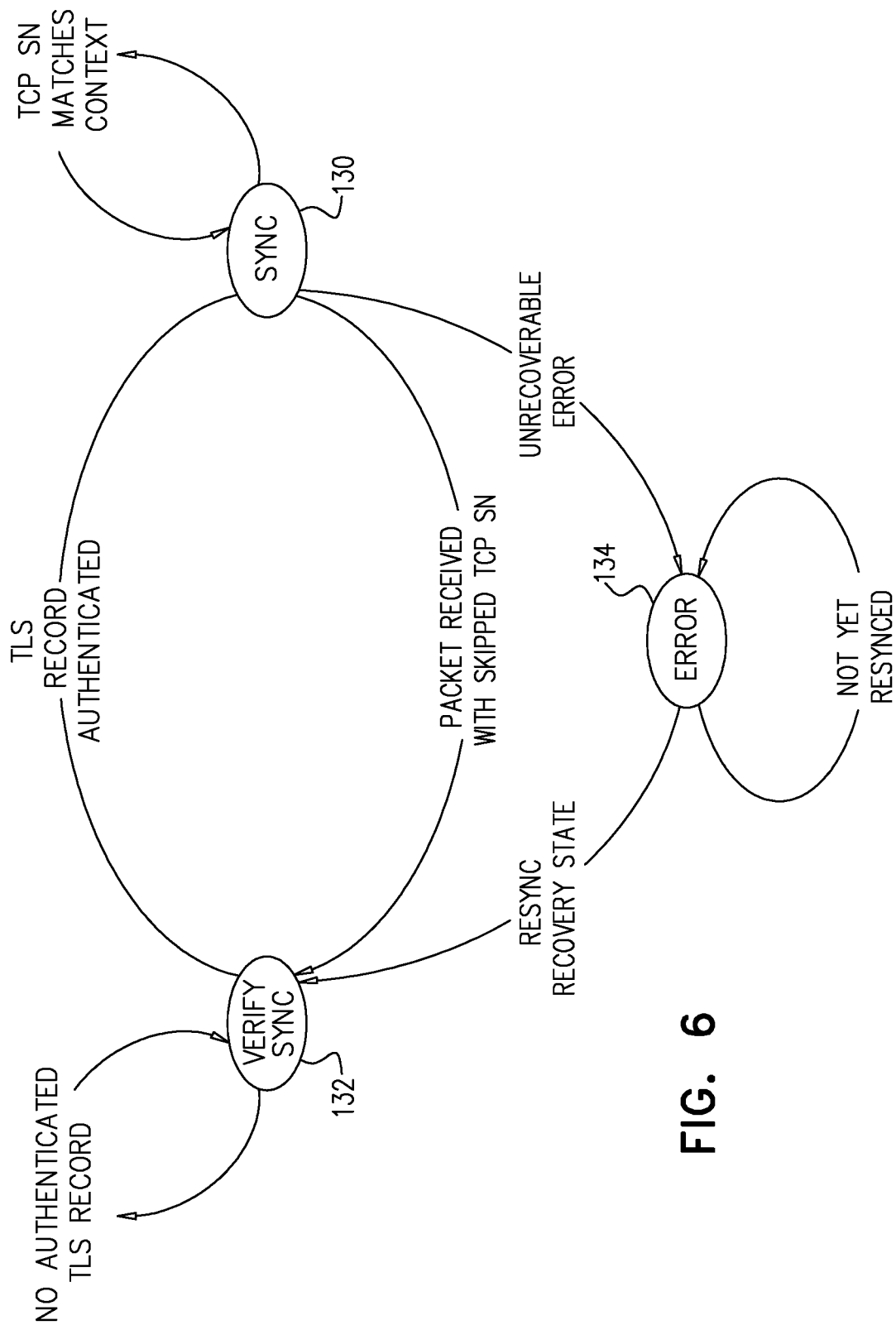

FIGS. 5 and 6 are state diagrams that schematically illustrate state machines maintained by accelerator 42 for processing of packets received from network 24, in accordance with an embodiment of the invention. The state machines run in parallel for each flow of TCP packets containing TLS records. They ensure that the operation of accelerator 42 is properly synchronized with the TCP packet flow and TLS record flow, as long as packets are received in order, and enable recovery of synchronization and reconstruction of context data 44 when a packet is received out of order.

As shown in FIG. 5, operation of accelerator 42 on a given TCP flow begins in a tracking state 120, after driver software 46 has initialized the context for this TLS session. The accelerator remains in this state as long as successive TLS headers are received in order. When a packet is received with an out-of-order TCP sequence number (as at step 108 in FIG. 4), however, accelerator 42 enters a search state 122, where it remains until a new TLS header is found.

In some cases, the next TLS header 62 can be found using the length field, as explained above. Alternatively, when the record length is unavailable, accelerator 42 can search over packets 54 until it finds a known data value that is expected to appear in the TLS headers. Specifically, in recent TLS standards, the TLS version number in header 62 is required to be 0x0303, as noted earlier. Thus, in search state 122, accelerator 42 searches for this value and, upon finding it, returns to tracking state 120. In the tracking state, accelerator 42 checks the TLS record length and verifies that the next TLS header (and specifically the version number) is at the expected location. The probably of error in this method of tracking is very small.

Similarly, the state machine of FIG. 6 for each TCP/TLS flow begins in a sync state 130, and accelerator 42 remains in this state as long as TCP packets 54 are received in order. When NIC 34 receives a packet with a PSN lower than that expected according to context data 44, accelerator 42 may simply pass the packet to memory 30 without decryption, or it may decrypt the packet using a set of context data that was saved previously, as explained above, while remaining in sync state 130. Otherwise, when NIC 34 receives a packet with a PSN greater than that expected according to context data 44, accelerator 42 concludes that a packet has been skipped, and moves to a sync verification state 132. In this state, accelerator 42 passes packets to memory 30 without decryption, while waiting for the results of search state 122.

Accelerator 42 remains in sync verification state 132 until it has found and authenticated header 62 of a subsequent TLS record 56, at which point the accelerator returns to sync state 130. Authentication can be based, for example, on finding the version number in the expected location in the next record. Alternatively or additionally, accelerator 42 may report the context values that it has found to software running on CPU 28, which will then confirm or reject the values. Once the TLS header has been authenticated, accelerator 42 returns to sync state 130, with the correct, updated TCP PSN and TLS sequence number.

As another alternative, accelerator 42 may guess the value of the current TLS record sequence number, use this guess in calculating the TLS tag value, and then verify that the guess was correct by comparing the calculated tag value to the actual tag 60 of the record. The guess can be based, for example, on adding 1 to the last known TLS record value. If the verification fails, accelerator may increment the guessed sequence number (for example, by adding 3 to the last known TLS record value) and verify the incremented value against the next record that is found.

In some cases, while in sync state 130, accelerator 42 may encounter an unrecoverable error, such as an authentication failure or bad record format. In this case, the accelerator moves to an error state 134, and accelerator 42 passes packets to memory 30 without decryption until resynchronization has been completed under the control of software running on CPU 28.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. Packet processing apparatus, comprising:
   a first interface configured to be coupled to a host processor;
   a second interface configured to transmit and receive data packets, comprising respective headers and payloads, to and from a packet communication network;
   a memory, configured to hold context information with respect to one or more flows of the data packets conveyed from the host processor to the network via the apparatus in accordance with a reliable transport protocol, which assigns respective serial numbers to the data packets in each of the flows, and with respect to encoding, in accordance with a session-layer protocol, of data records that are conveyed in the payloads of the data packets in the one or more flows; and
   processing circuitry, which is coupled between the first and second interfaces and configured to transmit the data packets through the second interface to the packet communication network in accordance with instructions from the host processor, and which comprises acceleration logic, which is configured to encode the data records in accordance with the session-layer protocol using the context information while updating the context information in accordance with the serial numbers and the data records of the transmitted data packets, wherein the acceleration logic is configured, upon receiving an instruction from the host processor to retransmit a specific data packet, not acknowledged by a destination, after the context used for processing when originally transmitting the specific data packet has been updated for processing subsequent data packets, to reconstruct the context information with respect to the specific data packet, to re-encode a payload of the specific data packet using the reconstructed context information, and to retransmit the specific data packet to the packet communication network.

2. The apparatus according to claim 1, wherein at least some of the data records have respective lengths that span multiple consecutive data packets, and wherein the acceleration logic is configured, in response to receiving the instruction, to reconstruct the context data and re-encode a part of a data record that is to be retransmitted in the specific data packet.

3. The apparatus according to claim 2, wherein the acceleration logic is configured to reconstruct the context data using metadata concerning the data record that was transmitted in one or more of the data packets in the flow that preceded the specific data packet that is to be retransmitted.

4. The apparatus according to claim 1, wherein the acceleration logic is configured to receive the instruction to retransmit the specific data packet after having transmitted one or more subsequent data packets in the flow to the network, and to reconstruct a first context for use in re-encoding the payload of the specific data packet that is to be retransmitted while saving a second context that was updated with respect to the one or more subsequent data packets, and to resume encoding the data records using the second context after retransmission of the specific data packet.

5. The apparatus according to claim 1, wherein the reliable transport protocol comprises a Transmission Control Protocol (TCP).

6. The apparatus according to claim 1, wherein encoding the data records comprises encrypting the data records in accordance with the session-layer protocol.

7. The apparatus according to claim 6, wherein the session-layer protocol comprises a Transport Layer Security (TLS) protocol.

8. The apparatus according to claim 1, wherein the acceleration logic is configured to receive with the instruction, metadata on data transmitted in packets transmitted between the original transmission of the specific data packet, and the reception of the instruction, and wherein the acceleration logic is configured to use the received metadata in reconstructing the context.

9. The apparatus according to claim 1, wherein the acceleration logic is configured to read and process data from packets transmitted between the original transmission of the specific data packet, and the reception of the instruction, in reconstructing the context.

10. The apparatus according to claim 1, wherein the acceleration logic is configured to receive instructions on packets to be transmitted, by reading descriptors from a descriptor queue.

11. The apparatus according to claim 10, wherein the acceleration logic is configured to receive metadata for reconstructing the context in a descriptor instructing to perform the retransmission.

12. The apparatus according to claim 10, wherein the acceleration logic is configured to receive metadata for reconstructing the context in a special descriptor provided separately from the descriptor instructing to perform the retransmission.

13. The apparatus according to claim 1, wherein the acceleration logic is configured to receive metadata for reconstructing the context in packets transmitted from the host processor.

14. A method for packet processing, comprising:
receiving instructions via a first interface from a host processor with respect to data packets, comprising respective headers and payloads, that are to be transmitted to a packet communication network via a second interface;
storing in a memory context information with respect to one or more flows of the data packets that are transmitted to the network via the second interface in accordance with a reliable transport protocol, which assigns respective serial numbers to the data packets in each of the flows, and with respect to encoding, in accordance with a session-layer protocol, of data records that are conveyed in the payloads of the data packets in the one or more flows;
in response to the instructions from the host processor, applying acceleration logic coupled between the first and second interfaces to encode the data records in accordance with the session-layer protocol using the context information, while updating the context information in accordance with the serial numbers and the data records of the transmitted data packets;
transmitting the data packets containing the encoded data records through the second interface to the packet communication network in accordance with the instructions from the host processor; and
upon receiving an instruction from the host processor to retransmit a specific data packet after the context used for processing when originally transmitting the specific data packet has been updated for processing subsequent data packets, applying the acceleration logic to reconstruct the context information with respect to the specific data packet, re-encode a payload of the specific data packet using the reconstructed context information, and retransmit the specific data packet through the second interface to the packet communication network.

15. The method according to claim 14, wherein at least some of the data records have respective lengths that span multiple consecutive data packets, and wherein applying the acceleration logic to reconstruct the context information and re-encode the payload comprises reconstructing the context data and re-encoding a part of a data record that is to be retransmitted in the specific data packet.

16. The method according to claim 15, wherein the context data is reconstructed using metadata concerning the data record that was transmitted in one or more of the data packets in the flow that preceded the specific data packet that is to be retransmitted.

17. The method according to claim 14, wherein the instruction to retransmit the specific data packet is received from the host processor after one or more subsequent data packets in the flow have been transmitted to the network, and wherein applying the acceleration logic to reconstruct the context information and re-encode the payload comprises reconstructing a first context for use in re-encoding the payload of the specific data packet that is to be retransmitted while saving a second context that was updated with respect to the one or more subsequent data packets, and resuming encoding the data records using the second context after retransmission of the specific data packet.

18. The method according to claim 14, wherein the reliable transport protocol comprises a Transmission Control Protocol (TCP).

19. The method according to claim 14, wherein encoding the data records comprises encrypting the data records in accordance with the session-layer protocol.

20. The method according to claim 19, wherein the session-layer protocol comprises a Transport Layer Security (TLS) protocol.

21. The method according to claim 14, wherein receiving the instruction comprises receiving with the instruction, metadata on data transmitted in packets transmitted between the original transmission of the specific data packet, and the reception of the instruction, and wherein the acceleration logic uses the received metadata in reconstructing the context.

22. The method according to claim 14, and comprising reading and processing data from packets transmitted between the original transmission of the specific data packet, and the reception of the instruction, by the acceleration logic, in reconstructing the context.

23. The method according to claim 14, and comprising receiving, by the acceleration logic, instructions on packets to be transmitted, by reading descriptors from a descriptor queue.

24. The method according to claim 23, and comprising receiving, by the acceleration logic, metadata for reconstructing the context in a descriptor instructing to perform the retransmission.

25. The method according to claim 23, and comprising receiving, by the acceleration logic, metadata for reconstructing the context in a special descriptor provided separately from the descriptor instructing to perform the retransmission.

26. The method according to claim 14, wherein and comprising receiving, by the acceleration logic, metadata for reconstructing the context in packets transmitted from the host processor.

* * * * *